(12) United States Patent
Coleman et al.

(10) Patent No.: US 11,272,672 B2
(45) Date of Patent: Mar. 15, 2022

(54) GRASS TREATMENT SYSTEM AND METHOD

(71) Applicant: MTD Products Inc, Valley City, OH (US)

(72) Inventors: John Coleman, Sheffield (GB); Darren Williams, Chesterfield (GB)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 16/207,536

(22) Filed: Dec. 3, 2018

(65) Prior Publication Data

US 2019/0166773 A1    Jun. 6, 2019

Related U.S. Application Data

(60) Provisional application No. 62/593,403, filed on Dec. 1, 2017.

(51) Int. Cl.
| | |
|---|---|
| *A01G 20/43* | (2018.01) |
| *E01H 1/05* | (2006.01) |
| *A01B 45/00* | (2006.01) |
| *B08B 1/00* | (2006.01) |
| *B08B 1/04* | (2006.01) |
| *E01C 19/15* | (2006.01) |
| *E01C 19/20* | (2006.01) |

(52) U.S. Cl.
CPC .............. *A01G 20/43* (2018.02); *A01B 45/00* (2013.01); *B08B 1/002* (2013.01); *B08B 1/04* (2013.01); *E01H 1/056* (2013.01); *E01C 19/15* (2013.01); *E01C 19/20* (2013.01)

(58) Field of Classification Search
CPC ........ A01B 45/00; A01G 20/43; B08B 1/002; B08B 1/04; E01C 19/15; E01C 19/20; E01H 1/056; E01H 1/05
See application file for complete search history.

(56) References Cited

U.S. PATENT DOCUMENTS 901,154 A * 10/1908 Crozier ................... E01H 1/056
15/82
1,565,174 A * 12/1925 McAnerney .......... A47L 9/0461
15/388

(Continued)

FOREIGN PATENT DOCUMENTS

| CN | 2173806 Y | * | 8/1994 |
| CN | 2784457 | | 5/2006 |
| CN | 2784457 Y | * | 5/2006 |

OTHER PUBLICATIONS

Machine translation of CN2173806Y (Year: 1994).*
International Search Report and Written Opinion for Appl. No. PCT/US2018/063583 dated Jan. 28, 2019, pp. 1-14.

*Primary Examiner* — Douglas Lee
(74) *Attorney, Agent, or Firm* — Wegman Hessler

(57) ABSTRACT

A grass treatment system includes a first ground engaging rolling element, a second ground engaging rolling element, a comb having a leading edge including a plurality of comb teeth spaced apart at intervals, the comb is mounted between the first and second rolling elements and transversely to a direction of travel, a substantially cylindrical brush positioned above the comb and configured to engage at least a portion of a top surface of the comb, wherein the brush rotates relative to the comb to propel debris lifted from an area of turf grass by the comb.

15 Claims, 15 Drawing Sheets

(56) References Cited

U.S. PATENT DOCUMENTS

| | | | | |
|---|---|---|---|---|
| 3,759,022 | A | * | 9/1973 | Snyder .................. A01D 57/01 56/252 |
| 3,946,543 | A | * | 3/1976 | Templeton ............. A01D 42/02 56/10.9 |
| 5,353,881 | A | * | 10/1994 | Lee ....................... A01B 33/028 172/113 |
| 2011/0247152 | A1 | | 10/2011 | Dairon et al. |
| 2012/0180448 | A1 | * | 7/2012 | Slater .................... A01D 43/00 56/193 |
| 2013/0145572 | A1 | * | 6/2013 | Schregardus ....... A47L 11/4011 15/319 |

* cited by examiner

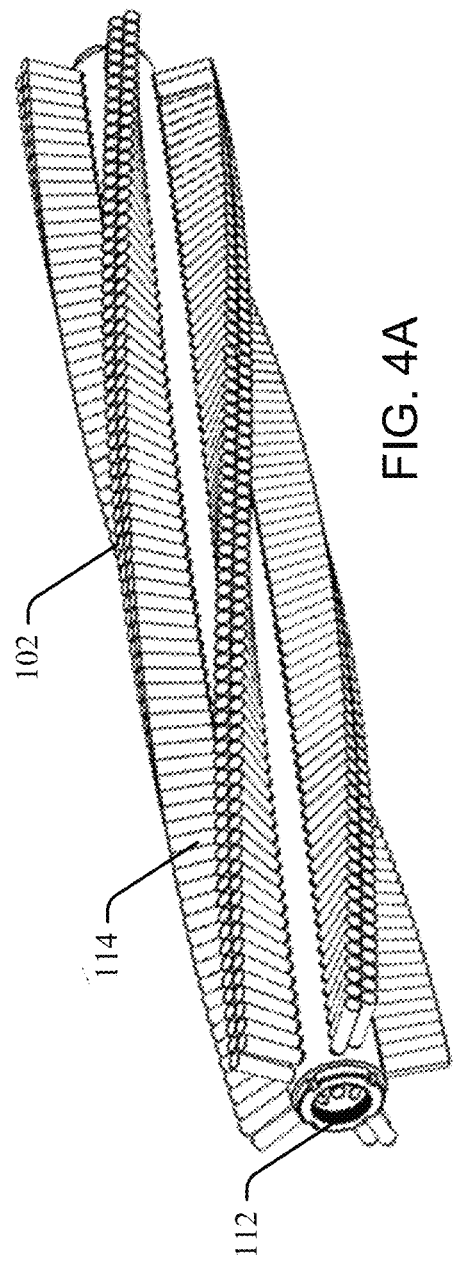
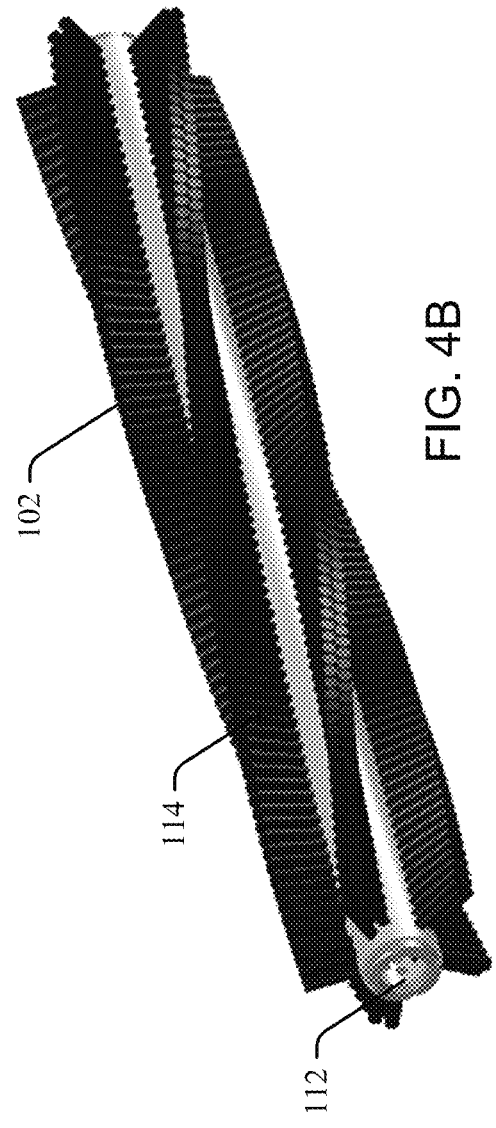
FIG. 4A
FIG. 4B

SECTION A-A

GRASS TREATMENT SYSTEM AND METHOD

CROSS REFERENCE TO RELATED APPLICATIONS

This application claims the benefit of U.S. Provisional Application No. 62/593,403, filed Dec. 1, 2017, the entire disclosure of which is hereby incorporated herein by reference.

FIELD OF THE INVENTION

This disclosure relates generally to grass treatment systems and methods, and in particular but not exclusively, to a turf cleaner and its use in gathering and removing debris from athletic field turf grass, and other highly maintained natural and artificial turf grass areas.

BACKGROUND OF THE INVENTION

Maintenance costs for grass sports fields, golf courses, and grass tennis courts are significant, and it is imperative that intensively managed sports turf be maintained correctly. One of the most important factors in attaining the correct environment for sports turf is to retain a clean, debris free surface. Any form of non-intended material that lies in or on top of the turf surface can lead to a weakened grass plant through a lack of sunlight, and the creation of a localized microenvironment underneath the debris that can result in disease inducing conditions.

An example of a typical sports turf environment where surface debris must be removed to maintain good turf sward integrity is immediately after an event, such as a game, match, or tournament, when debris may remain within or on top of the turf surface. A recent trend has been the use of traditional rotary mowers operating as vacuum cleaners used to gather the debris. However, the rotary mower can cause damage to the carefully maintained grass. Rotary blades do not provide a clean cut on sports turf, and rip the plant. This ripping can result in pathogen entry points, leading to disease ingress. The grass plant is stressed, loses color and is generally weakened through the action of the ripping caused by the rotary blades. Moreover, this approach does not always work well since the high speed spinning of rotary mower blades, and the resulting air currents and pressures, tend to make the debris more difficult to pick up.

Conventional lawn and turf vacuums generally include powerful engines in order to generate the air movement necessary for debris collection, and are thus quite heavy. The heavy machines cause compaction and damage to the soil structure. Soil structure is important because it determines the ability of the soil to hold and conduct water, nutrients, and air vital for root growth and plant health. Therefore, conventional lawn and turf vacuums are not well-suited for use on highly maintained sports turf.

BRIEF SUMMARY OF THE INVENTION

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

In an embodiment, a grass treatment system includes a first ground engaging rolling element, a second ground engaging rolling element, a comb having a leading edge including a plurality of comb teeth spaced apart at intervals, the comb is mounted between the first and second rolling elements and transversely to a direction of travel, a substantially cylindrical brush positioned above the comb and configured to engage at least a portion of a top surface of the comb, wherein the brush rotates relative to the comb to propel debris lifted from an area of turf grass by the comb.

In an embodiment, the comb teeth are positioned to intersect with an upper surface of the turf grass, and are operative to lift debris from a surface of the turf grass to an area within a reach of the brush. In further embodiments the brush includes a substantially cylindrical core extending along a longitudinal axis; and a plurality of radially extending bristles extending longitudinally along the surface of the core. In further embodiments, the bristles are arranged in one or more columns disposed in one or more helical paths about at least a portion of the longitudinal axis of the core.

In yet another embodiment, the comb includes a generally planar structure having a continuous spine along a longitudinal direction and transverse to a direction of travel of the system, and the plurality of comb teeth extend orthogonally to the spine.

In an embodiment, the comb includes an elongated spine, and a plurality of comb teeth extending outwardly from one edge of the spine. In other embodiments, a plurality of arcuate teeth extend outwardly from one edge of the spine. In an embodiment, the comb includes generally equally spaced teeth having an elongated saw tooth profile.

In other embodiments, the grass treatment system includes at least one height adjustment mechanism for calibrating an aperture between the upper surface of the comb and at least a portion of an outer edge of the brush. In aspects, the aperture between the comb and an outer edge of the brush is between about 0 mm to 50 mm. In embodiments, at least one height adjustment mechanism is provided for adjustment of a distance from the comb to a surface of the turf. In an embodiment, the comb is positioned to contact a top portion of the turf grass surface equal to or less than about one third a length of the turf grass.

In aspects, the comb and/or the brush include a non-stick nanocoated film having hydrophobic or hydrophilic properties. In an embodiment, the grass treatment system includes a rotatable groomer positioned between the comb and brush, and the groomer includes alternating angled blades.

In further embodiments, a grass treatment system for removing debris from an area of turf grass includes a first ground engaging rolling element and a second ground engaging rolling element, a comb having a leading edge comprising a plurality of comb teeth spaced apart at intervals, a substantially cylindrical brush positioned above the comb and configured to rotate relative to the comb to propel debris lifted from an area of turf grass by the comb, wherein the comb is mounted between the first and second rolling elements and the comb teeth are disposed forward of the brush relative to a direction of travel, and wherein the comb teeth are positioned to intersect with an upper surface of the turf grass, and are operative to lift debris from a surface of the turf grass to an area within a reach of the brush.

In yet another aspect of the disclosed technology, a grass treatment system for artificial turf includes a first ground engaging rolling element and a second ground engaging rolling element, a comb having a leading edge comprising a plurality of comb teeth spaced apart at intervals, wherein the comb is mounted between the first and second rolling elements and transversely to a direction of travel, a substantially cylindrical brush positioned above the comb and configured to engage at least a portion of a top surface of the comb, wherein the comb engages the artificial turf at a height effective to lift a portion of crumb infill from the artificial turf to an area on a top surface of the comb within a reach of the brush, and the brush rotates relative to the comb to propel and redistribute the crumb infill back to the artificial turf.

In an embodiment, a method of removing debris from an area of turf grass includes providing a grass treatment system, including (i) a first ground engaging rolling element, (ii) a second ground engaging rolling element, (iii) a comb having a leading edge comprising a plurality of comb teeth spaced apart at intervals, wherein the comb is mounted between the first and second rolling elements and transversely to a direction of travel, (iv) a substantially cylindrical brush positioned above the comb and configured to engage at least a portion of a top surface of the comb, wherein the brush rotates relative to the comb, positioning the grass treatment system closely adjacent a surface of the turf grass such that the comb may engage debris on and around the turf grass surface; and moving the grass treatment system closely adjacent the turf grass surface so that, as the grass treatment system moves, (i) the comb engages the debris, and (ii) the rotating brush removes at least a portion of the debris from the top surface of the comb.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

The features of the disclosure, and their advantages, are illustrated specifically in embodiments of the invention now to be described, by way of example, with reference to the accompanying diagrammatic drawings, in which:

FIGS. 4A and 4B are illustrations of example grass treatment system brushes in accordance with aspects of the disclosure.

Figure 1:
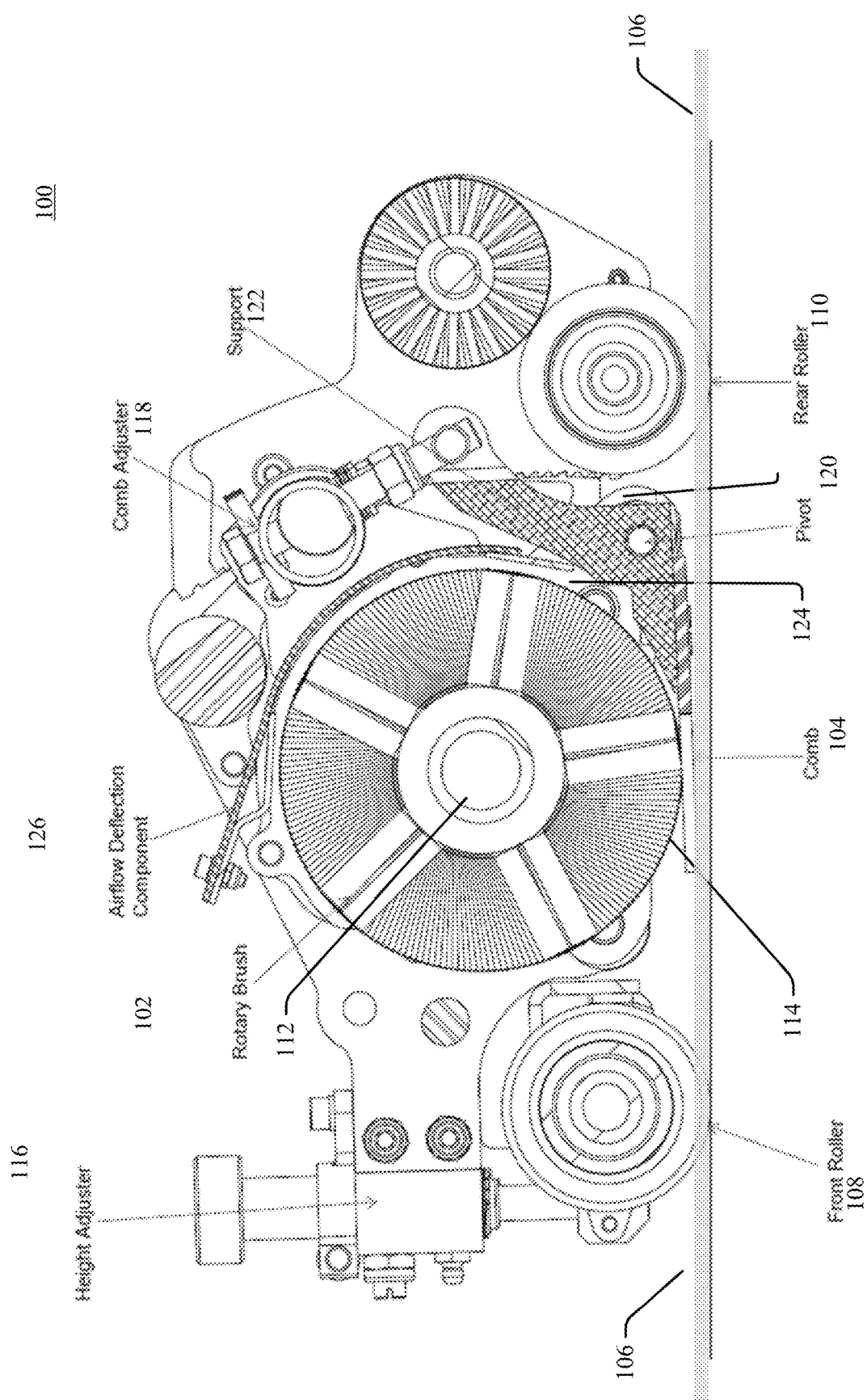
FIG. 1 is a side sectional view of an example grass treatment system in accordance with an aspect of the disclosure.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

Embodiments of grass treatment systems are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For purposes of description herein, the terms "top", "bottom", "upper", "lower", "upward", "downward", and derivatives thereof, shall relate to the grass treatment system as oriented and shown, for example, in FIG. 1.

For purposes of description herein, the terms "turf grass", "grass", "artificial turf", "grass plants", "grass blades" and the like, refer to numerous types and varieties of natural and artificial grasses such as those used on athletic fields and lawns, for example, on soccer fields, tennis courts, golf courses, baseball fields, football fields, recreational sites, residential and commercial lawns, and other similar grass covered areas.

For purposes of description herein, the term "debris" refers to any of grass clippings, leaves, soil, organic material, artificial turf infill, paper, litter, rubbish, and most any other pieces of scattered waste or remains.

The disclosed grass treatment system provides turf cleaning and debris removal while preventing or minimizing harm to the grass plants. The disclosed technology can remove surface debris on sports turf without unduly damaging the grass plants. The disclosed grass treatment system gently lifts debris that is present on and around the turf surface, and propels the debris along to a collection container.

The disclosed system is lightweight when compared to, for example, traditional turf vacuum equipment which is generally heavy and causes soil compaction impeding root growth, and decreasing the grass plant's ability to take up nutrients and water. The disclosed grass treatment system is lightweight and energy efficient, and minimizes compaction of the underlying soil.

Referring to FIG. 1, there is illustrated a side view of an example grass treatment system 100 in accordance with the disclosed technology. In an embodiment, the grass treatment system 100 is formed as a cassette or interchangeable cartridge for attachment to a reel mower, or similar machine. The grass treatment system 100 can be mounted, for example, to the frame of the reel mower (not shown).

The grass treatment system 100 includes a rotating brush 102 and a comb 104 which cooperates with the brush 102 to lift, gather and remove debris on and around the surface of the turf grass 106. The brush 102 is rotatable about a substantially horizontal, transverse axis. The rotating brush 102 comprises a core 112 and bristles 114. The brush 102 and a comb 104 are oriented transversely to the direction of travel of the grass treatment system 100.

The grass treatment system 100 can include front and rear ground engaging rolling elements, (e.g. wheels or rollers) 108, 110 respectively, for supporting the grass treatment system 100, and for moving the grass treatment system 100 over the ground.

The front rolling element 108 is disposed towards the front of the grass treatment system 100 relative to the direction of travel of the grass treatment system 100. The rear rolling element 110 is disposed towards the rear of the grass treatment system 100 relative to the direction of travel of the grass treatment system 100. The brush 102 and comb 104 are positioned between the front rolling element 108 and the rear rolling element 110.

The front rolling element 108 and the rear rolling element 110 are configured to be in contact with the grass surface 106 to assist in smooth movement of the grass treatment system 100 over the grass surface 106, and to maintain a height of the comb 104 relative to the grass surface 106.

A height adjustment mechanism 116, and a comb adjustment mechanism 118 are operable to position the comb 104 at an optimal height above the turf 106, depending for example, on what type of debris is to be removed, and/or to control the amount of turf grass 106 that will be contacted and lifted by the comb 104. In an embodiment, the comb adjustment mechanism 118 is operably connected to a comb support 120 and pivot 122. Collected debris is propelled by the brush 102, and by air currents produced by the rotating brush 102, along the chute 124 and guided past the airflow deflection component 126 to an optional grass catcher or collection container 1302 (shown in FIG. 13).

In an embodiment, the grass treatment system 100 comprises a reel mower cutting unit having a brush 102 installed in place of a conventional rotating cutting reel, and a comb 104 installed in place of a bedknife. In other embodiments, the grass treatment system comprises a reel mower cutting unit having a rotatable cutting reel which sweeps standing grass against a bedknife to cut the grass, and a comb 104 positioned near the bedknife such that that the comb 104 contacts the turf grass before it is cut.

In general, conventional reel mowers are known for precision cutting of grass such as that found on sports fields and golf greens. A reel mower generally includes a frame on which a power source is supported, and a drive mechanism that propels the reel mower frame across the ground, the drive mechanism being powered by the power source.

Reel mowers also include a ground engaging reel cutting unit mounted to the reel mower frame. The reel cutting unit includes a rotating cutting reel having helical blades, and a bedknife which cooperates with the cutting reel to cut the grass, and front and rear ground engaging wheels or rollers for supporting the reel cutting unit, and for moving the cutting unit over the ground.

In an embodiment, the grass treatment system 100 gathers debris by positioning the comb 104 in front and near to the base of the turf canopy such that it collects and directs debris in to the path of the rotating cylindrical brush 102. In an embodiment, the comb 1014 is positioned to contact a top portion of the turf grass surface equal to or less than about one third a length of the turf grass. The action of the comb 104 has little or no detrimental effect on the grass plants. The rotating brush 102 does not come in to contact with the grass plant, and so the brush 102 also does not adversely affect the health of the grass.

Figure 2:
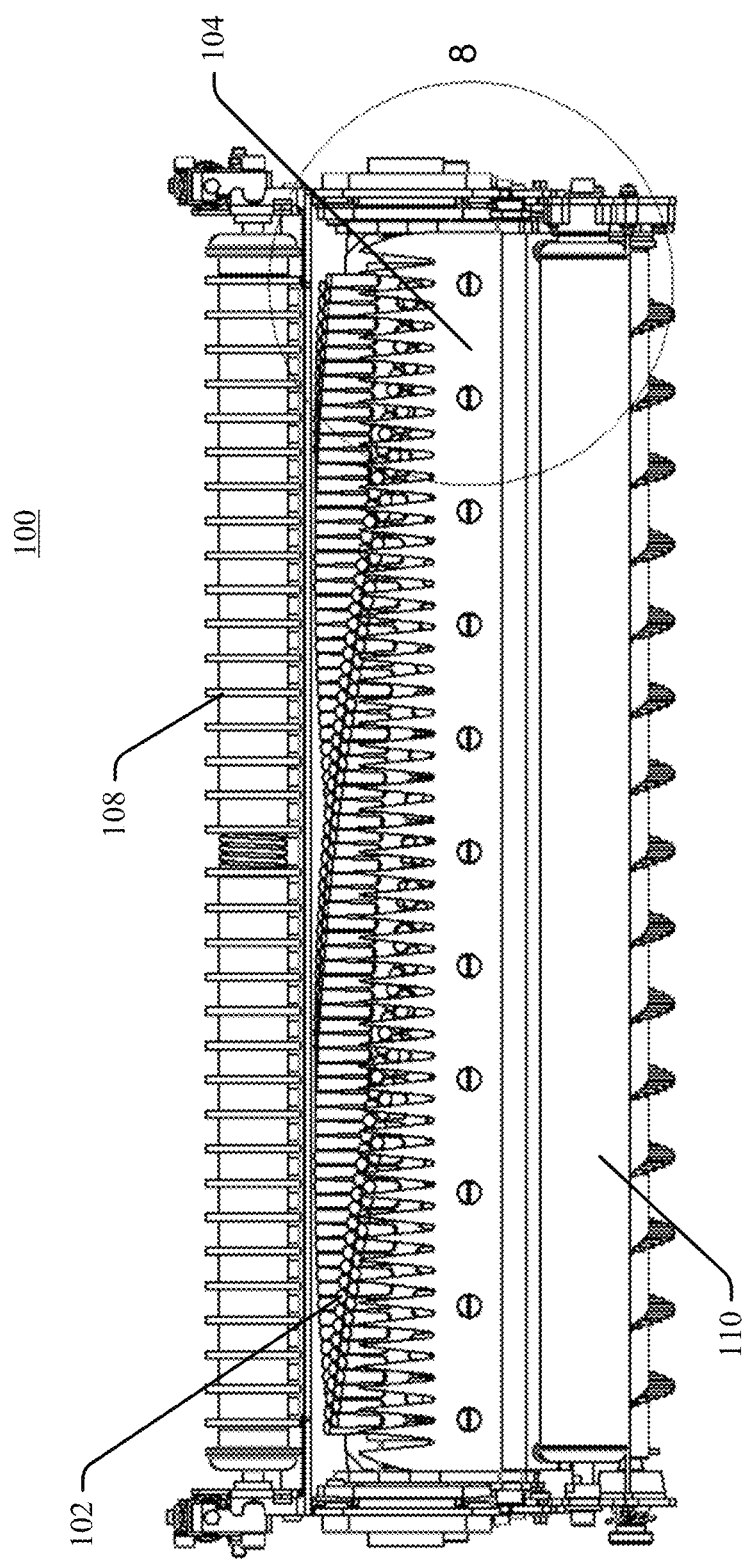
FIG. 2 is a bottom view of an example grass treatment system in accordance with aspects of the disclosure.
Figure 3A:
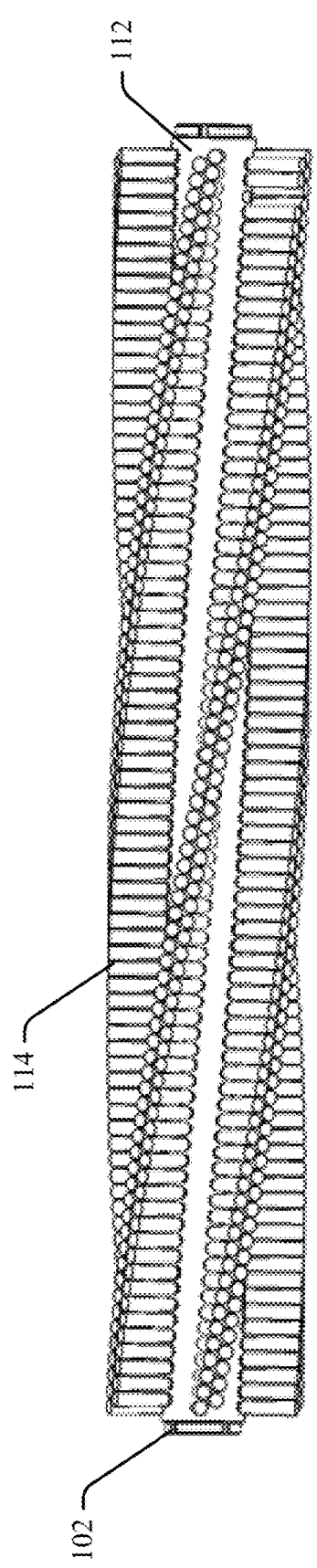
FIGS. 3A and 3B are illustrations of example grass treatment system brushes in accordance with aspects of the disclosure.
Figure 3B:
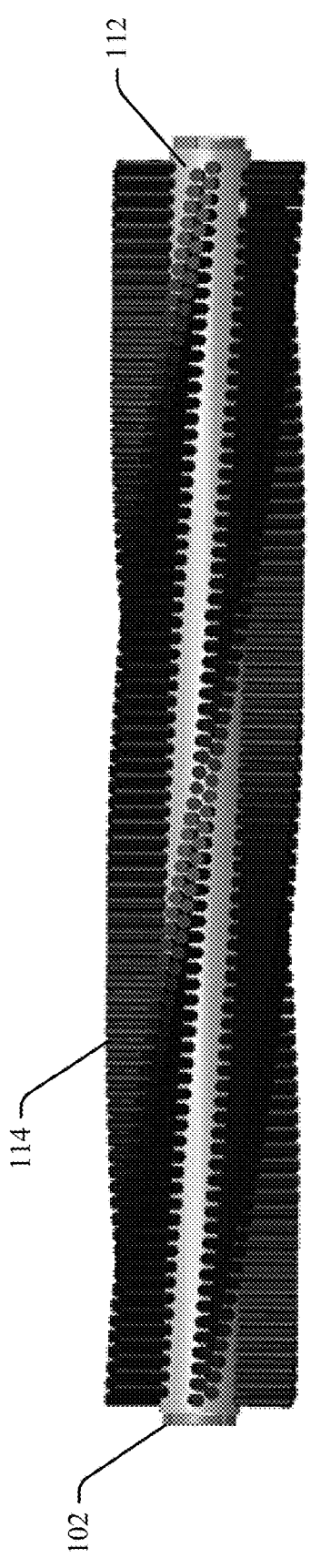

Referring to FIG. 2, a bottom view of an example grass treatment system 100 is illustrated. In an embodiment, the grass treatment system 100 comprises a cassette or interchangeable cartridge. A front roller 108 is disposed towards the front of the grass treatment system 100 relative to the direction of travel of the grass treatment system 100. The rear rolling element 110 is disposed towards the rear of the grass treatment system 100 relative to the direction of travel of the grass treatment system 100. The brush 102 and comb 104 are positioned between the front rolling element 108 and the rear rolling element 110.

Referring to FIGS. 3A, 3B, 4A, 4B, 5A and 5B, the brush 102 comprises a substantially cylindrical core 112 extending along a longitudinal axis. A plurality of radially extending bristles 114 are arranged in rows extending longitudinally along the surface of the cylindrical core 112. In an embodiment, the bristles 114 are arranged in a generally helical pattern on the brush core 112. For example, the bristles 114 can be arranged in one or more columns disposed in one or more spiral or helical paths about at least a portion of the longitudinal axis of the brush core 112.

In an embodiment, the bristles 114 are arranged in the same or a similar helical pattern as reel mower cutting blades. In other embodiments, the bristles 114 can be arranged in a plurality of columns or rows and disposed in substantially straight lines, or in a zig-zag pattern, along the brush core 112.

The brush core 112 can be a solid or hollow, substantially cylindrical structure. In an embodiment, the brush core 112 includes openings (not shown) to optimize air flow in and around the brush 102, and to enhance the performance of the grass treatment system 100.

As the grass treatment system 100 is moved across the turf surface 106, the comb 104 catches hold of the debris in its path, and presents it to the bristle tips 114 of the brush 102. The bristle tips 114 of the brush 102 contact the surface of the comb 104 and sweep the debris onward though the chute 124, and to a grass catcher 1302.

In operation, the brush 102 itself is rotated in a forward direction, which is the counter-clockwise direction in FIG. 1. The brush 102 can move at a relatively low rotational speed, for example between about 800 revolutions per minute (rpm) and 1800 rpm. Increasing the rotational speed of the brush 102 can improve fine debris pick up performance. For example, the brush 102 can be operated at a relatively higher rotational speed to gather fine grass clippings, and at a relatively slower rotational speed to collect larger debris, e.g. leaves, and paper litter.

Because the brush 102 rotates at a relatively slower speed, compared to the speed of a rotary mower, and because the brush 102 is configured to contact the comb 104 rather than the turf surface 106, the brush 102 gently lifts the debris and pushes it along to a grass catcher or bagger 1302, thereby preventing or minimizing damage to the grass blades.

Figure 5A:
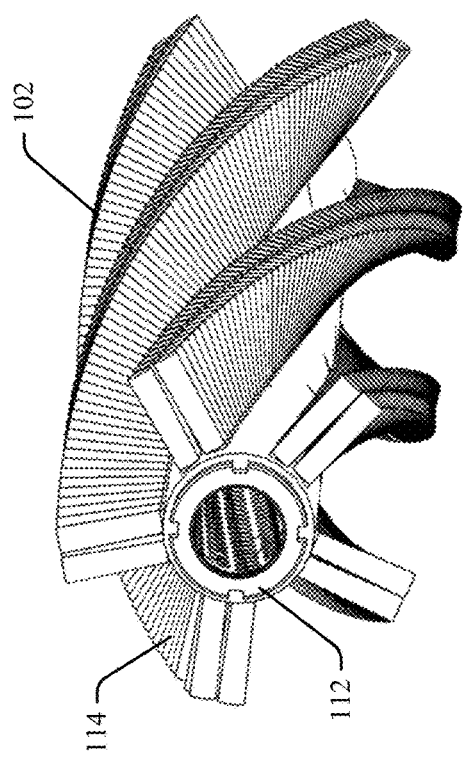
FIG. 5A is a side perspective view of an example grass treatment system brush in accordance with an aspect of the disclosure.
Figure 5B:
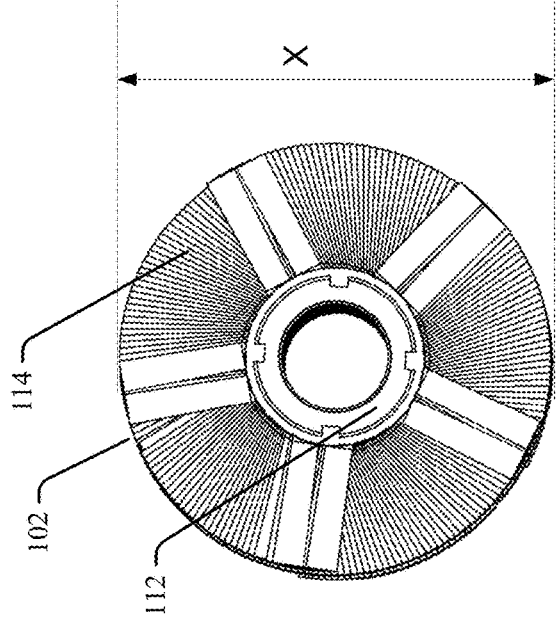
FIG. 5B is a side view of an example grass treatment system brush in accordance with an aspect of the disclosure.

With reference to FIG. 5B, the outside diameter of the brush 102, shown as "X" and measured from the tip of the bristles 114 to the tips of diametrically opposite bristles 114, can be from about 120 mm to 200 mm.

Figure 6A:
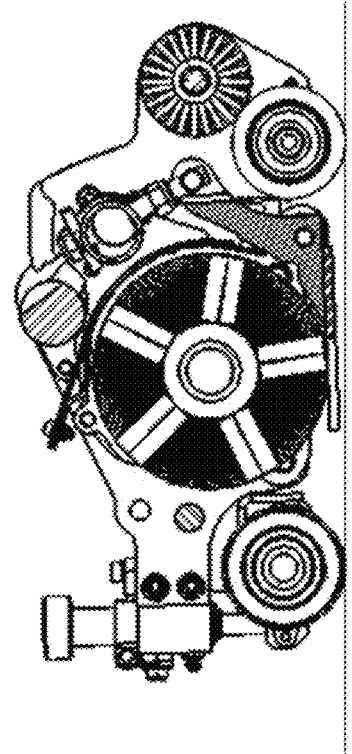
FIG. 6A is a side sectional view of an example grass treatment system in accordance with aspects of the disclosure.
Figure 6B:
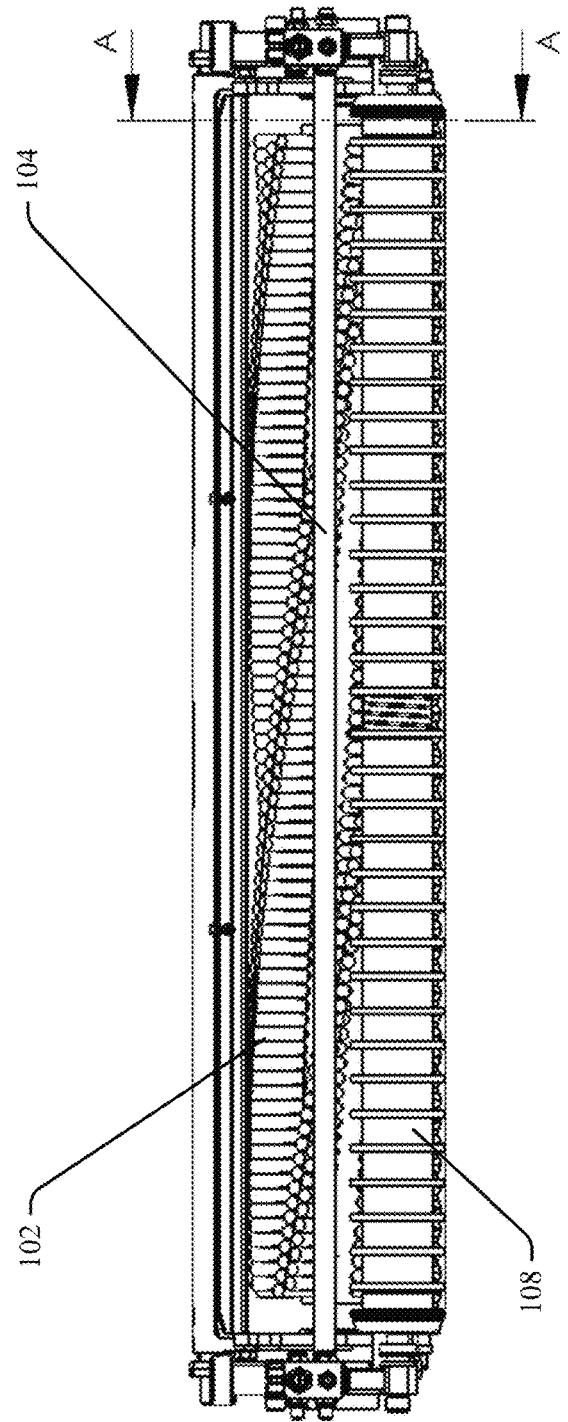
FIG. 6B is a front view of an example grass treatment system in accordance with aspects of the disclosure.

Referring to FIG. 6B, there is illustrated a front view of the grass treatment system 100, along section A-A as shown in FIG. 6A. In an embodiment, the comb 104 is substantially horizontal, parallel to brush 102 and to the ground. A front rolling element 108 is disposed towards the front of the grass treatment system 100, and the rear rolling element 110 is disposed towards the rear of the grass treatment system 100. The brush 102 and comb 104 are positioned between the front rolling element 108 and the rear rolling element 110.

Figure 7A:
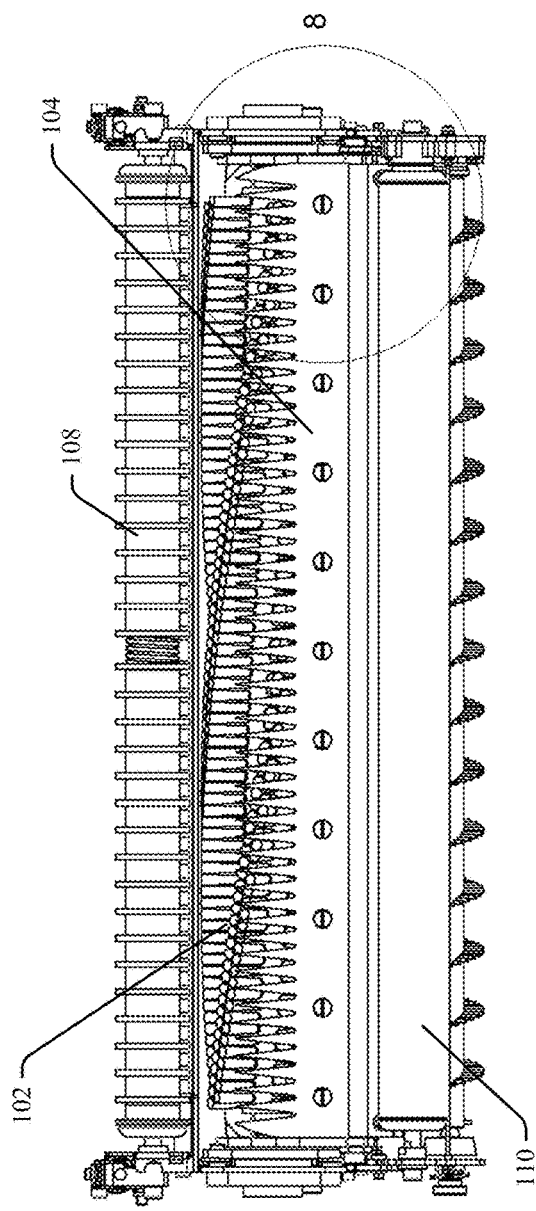
FIGS. 7A and 7B are illustrations of example grass treatment systems in accordance with aspects of the disclosure.
Figure 7B:
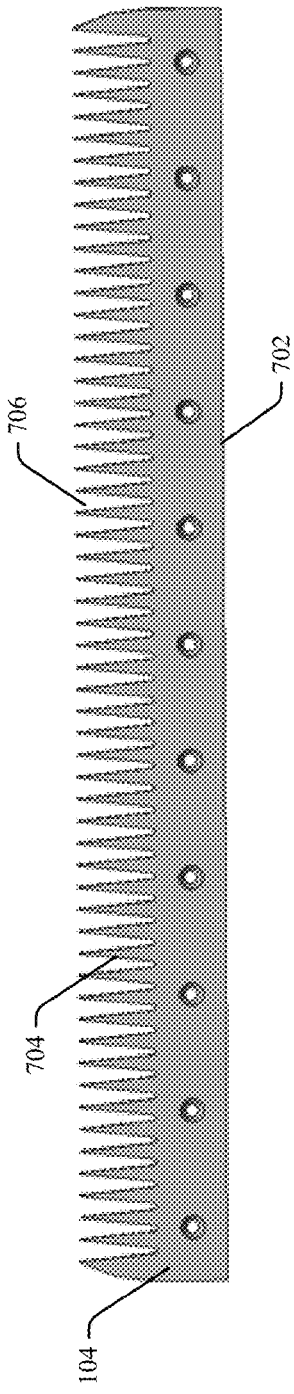
Figure 8:
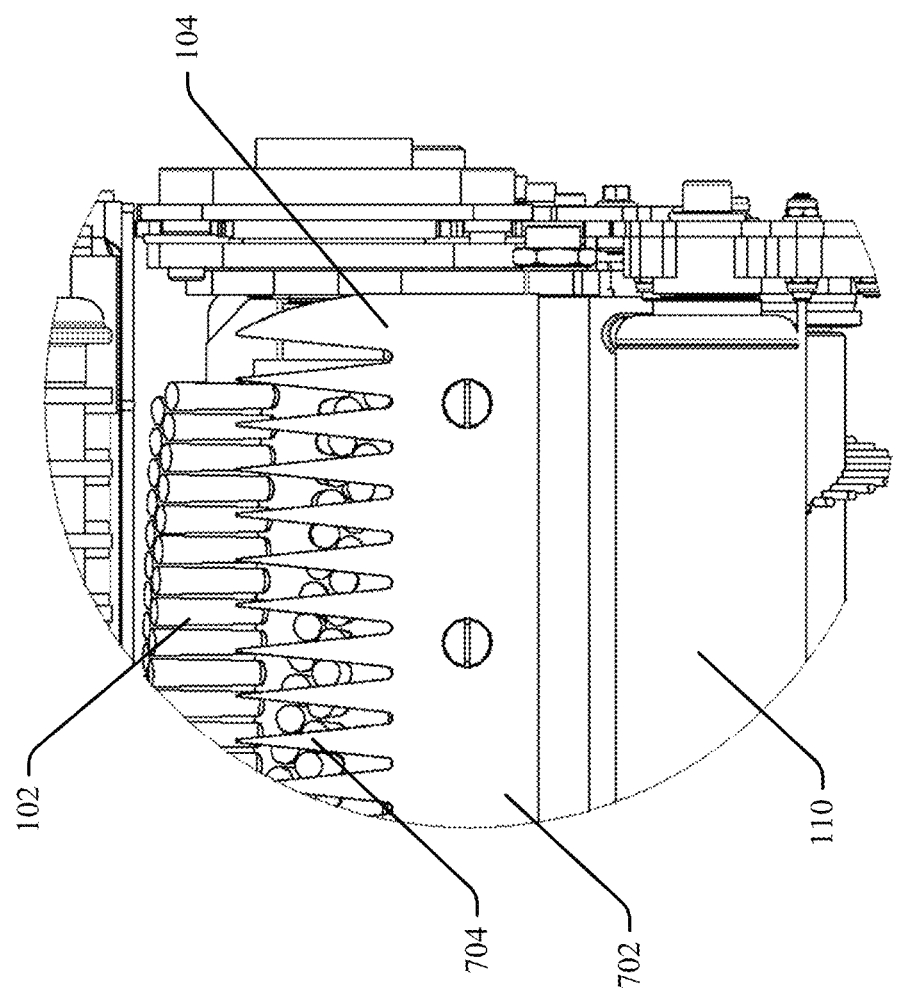
FIG. 8 is a detail bottom view of an example grass treatment system in accordance with aspects of the disclosure.

Referring to FIGS. 7A and 7B, and 8 the comb 104 includes an elongated spine 702 and a plurality of teeth 704 extending outwardly from one edge of the spine 702. In an embodiment, the comb 104 is generally planar extending in a longitudinal direction, and includes a plurality of pointed teeth 704 extending transversely thereto. In use, the comb 104 is moved in the direction of travel with the teeth portion 704 contacting the turf ahead of the spine portion 702.

In aspects, each adjacent comb tooth 704 is separated by a gap 706. In an embodiment, the dimensions of the gaps 706 between the teeth 704 comprise the complement to the dimensions of the teeth 704. In an embodiment, the comb teeth 704 can include a generally elongated sawtooth profile as shown. In other embodiments, the teeth 704 can be substantially straight, and the gaps 706 between the teeth 704 are substantially the same width as the width of the teeth 704. The shape and width of the comb teeth 704, and the width of the gaps 706, are subject to a wide range of dimensions depending on the nature of the debris to be removed from the turf surface 106, and the type of turf grass being treated. The length of the comb 104 can be comparable to the length of the brush 102.

In use, the comb 104 can be moved in the direction of travel with the teeth 704 portion contacting the turf ahead of the spine 702 portion. In an embodiment, as the grass treatment system is propelled and moves forwardly, the teeth 704 engage debris on and around the surface of the grass 106 and lift the debris, thereby positioning the debris to be contacted by the rotating brush 102, and moved along a chute 124 or exit path, for example, via air deflection component 126, to a collection container 1312 (shown in FIG. 13). In other embodiments the teeth 704 engage and lift the blades of grass 106, positioning the grass blades 106 to be cut at a uniform length by a cutting reel.

Debris making contact with the comb 104 is lifted off of the turf surface 106 and placed directly under the brush 102. In operation, the brush 102 is located above the comb 104 such that debris gathered on the upper surface of the teeth 704 is moved by the brush 102, and by air currents produced by the rotating brush, and propelled along through the chute 124.

The comb 104 is positioned underneath and in front the brush 102 such that the comb 104 contacts and collects debris that is present on top of, and in and around, the grass plants 106, and directs the debris towards the brush 102. As the brush 102 rotates, it contacts and propels the debris that is directed in its path along to the chute 124, and optionally a grass catcher for later disposal. Thus, debris can be gathered and removed without the brush 102 coming into contact with the turf grass 106.

The comb 104 lifts and moves debris material in to the path of the brush 102, therefore, the brush 102 is effective in removing the debris without harming the grass plants. Where brushes have been previously employed to clean the surface of turf grasses, the bristles of the brush contact and bruise the plant, leading to plant stress and injury. Furthermore, it has been found to be very difficult to achieve a sufficient level of sealing on the underside and rear of the conventional turf brush, which requires contact with the grass plant, because debris tends to leak underneath and behind the brush thereby reducing debris gathering effectiveness.

In contrast, the disclosed grass treatment system 100 includes a brush 102 mounted, for example, between a set of bearings and partially enclosed to prevent or minimize debris leakage on the underside and/or back portion of the brush 102 through which collected debris could escape and fall back to the turf surface 106. In an embodiment, the brush 102 substantially occludes the opening to the chute 124. Airflow is directed and debris leakage minimized by the combination of the comb 104 sealed against the underside of the support 122 and the airflow deflection component 126 sealed against the front portion of the support 122. The rotary spinning action of the rotating brush 102 collects the debris from the comb 104 after which the debris follows the sealed airflow path past the support 122, through the chute 124 and out along the airflow deflection component 126.

The height adjustment mechanism 116 and the comb adjustment mechanism 118 can be used to position the comb 104 at a prescribed height above the turf 106, and a prescribed distance from the brush 102 depending on what type of debris is to be removed, and/or to control the amount of grass that will be lifted by the comb 104. For example, when the majority of the debris includes grass clippings, the height adjustment mechanism 116 and the comb adjustment mechanism 118 can be used to adjust the position of the comb 104 relatively closer to the turf surface 106, and/or closer to the brush 102. When the majority of the debris includes leaves or litter, the comb 104 can be positioned relatively further from the turf surface 106, and/or further from the brush 102. In some applications, the comb 104 can be adjusted to be closer to the turf surface 106 and further from the brush 102, and vice versa.

In an embodiment, an additional adjustment mechanism (not shown) is provided for moving the comb 104 towards or away from the brush 102, thereby calibrating an aperture size between the brush 102 and comb 104, and dependent on the size of the debris material that is to be removed. For example, typical rubber crumb infill used on artificial turf is less compliant than organic material, and a larger aperture can be used to collect the crumb infill material effectively. In other embodiments, the aperture between the comb 104 and brush 102 can be adjusted for optimum debris flow and/or air flow, and to compensate for brush 102 wear. In an embodiment, the aperture between the comb and the outer edge of the brush bristles 114 can be adjusted to be between about 0 mm to 50 mm.

In an embodiment, the comb 104 includes coarser, widely spaced teeth 704. Coarser teeth can be used to lift relatively larger debris from the turf surface. For example, the teeth 704 can be spaced at about 50 to 60 teeth per meter. In other embodiments, the comb 104 includes relatively finer, closely spaced teeth 704 which can be used, for example, for removal of smaller debris (e.g. grass clippings) from the turf. For example, the teeth 704 can be spaced at about 40 to 50 teeth per meter.

In further embodiments, the comb 104 includes an adjustable teeth spacing. The optimal teeth spacing can be adjusted so that it is neither too wide to allow debris to pass through, nor too narrow which could make the comb 104 difficult to move along the turf surface.

The comb 104 can be comprised of most any suitable material, for example, steel, iron, aluminum or an impact resistant plastic. In an embodiment, the comb 104 comprises a metal having a powder coat finish. The comb 104 can comprise a metal or plastic material having a nanoparticle coating as discussed in detail infra.

FIG. 8 illustrates the detail view of the bottom view of FIG. 7A. In this embodiment, the grass treatment system 100 includes a comb 104 having a plurality of substantially straight teeth 904. The comb 104 is positioned underneath and in front the brush 102 such that the comb 104 contacts and collects debris that is present on and around the turf surface 106, and directs the debris towards the brush 102. The brush 102 and comb 104 are positioned between the front rolling element 108 and the rear rolling element 110.

Figure 9A:
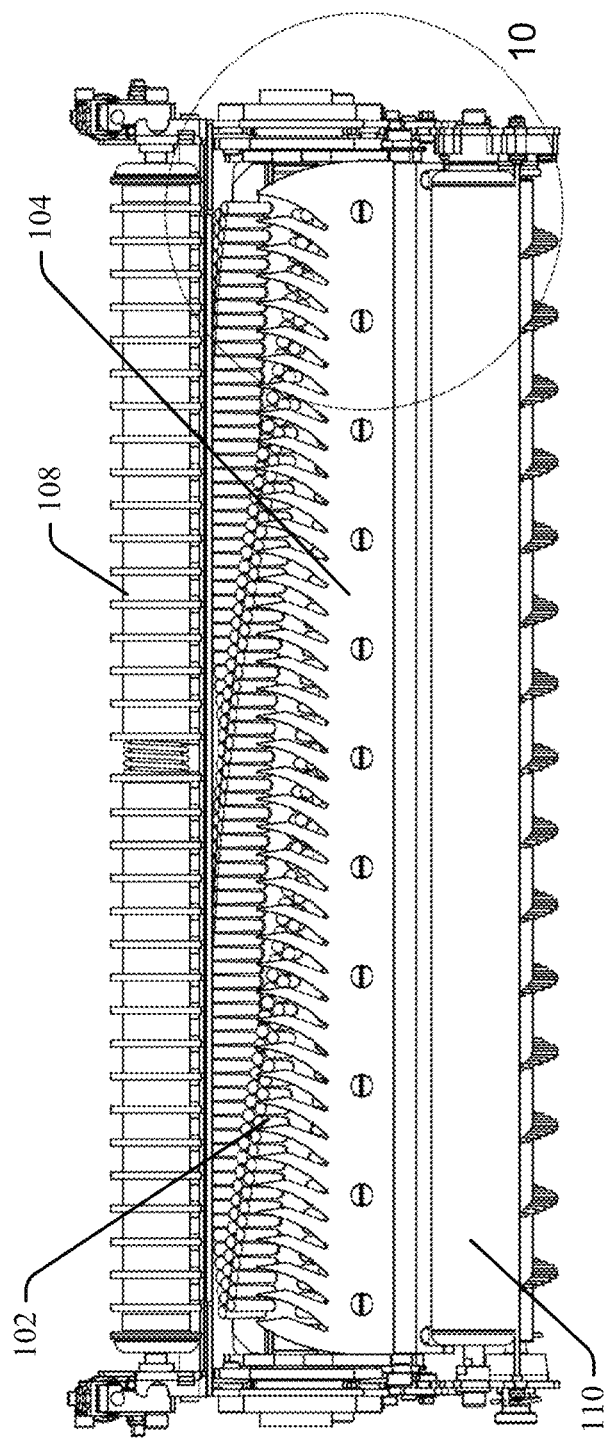
FIGS. 9A and 9B are illustrations of example grass treatment systems in accordance with aspects of the disclosure.
Figure 9B:
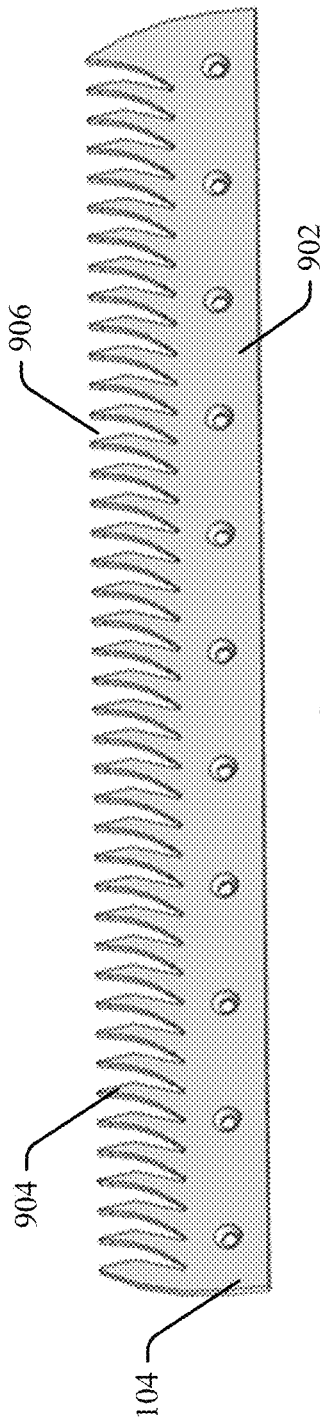
Figure 10:
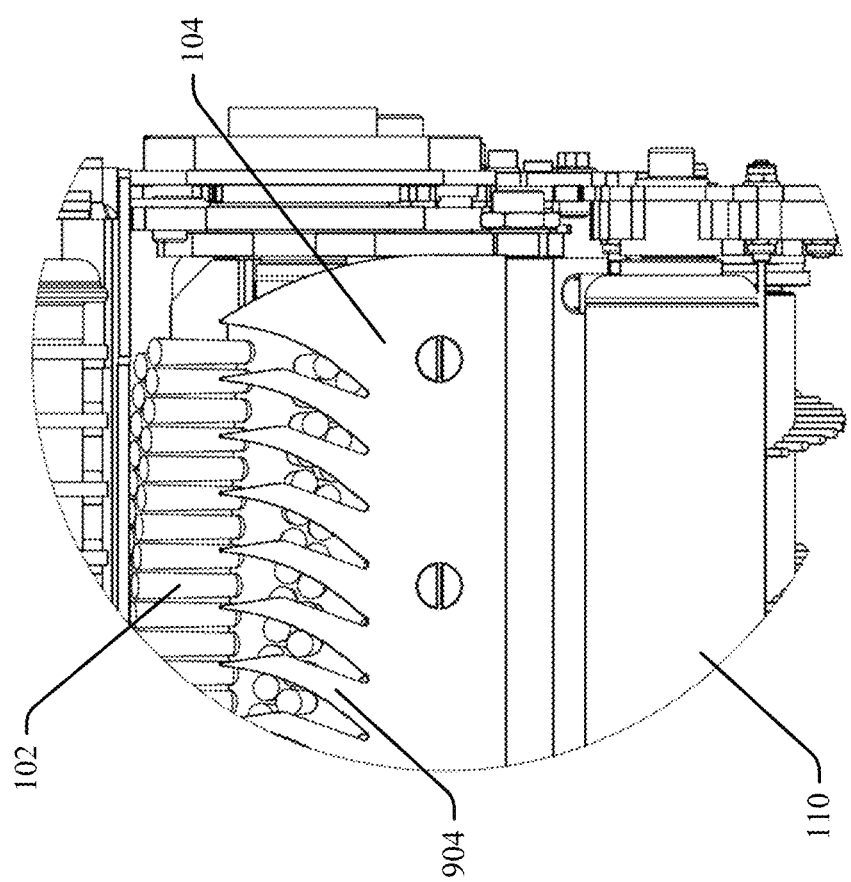
FIG. 10 is a detail bottom view of an example grass treatment system in accordance with aspects of the disclosure.

Referring to FIGS. 9A and 9B, and 10, the comb 104 includes an elongated spine 902 and a plurality of teeth 904 extending outwardly from one edge of the spine 902. In an embodiment, the comb 104 is generally planar extending in a longitudinal direction, and includes a plurality of substantially planar arcuate or curved teeth 904 extending transversely thereto. The curved teeth 904 can prevent or minimize the tendency of debris to accumulate in the valley between the comb teeth. In aspects, the gaps 906 between the teeth 104 can be substantially the same width as the width of the teeth 904.

In an embodiment, the comb 104 can include coarser, widely spaced and curved teeth 904. For example, the curved teeth 904 can be spaced at about 50 to 60 teeth per meter. In other embodiments, the comb 104 can include relatively finer, closely spaced curved teeth 904 which can be used, for example, for removal of smaller debris (e.g. grass clippings) from the turf. For example, the teeth 904 can be spaced at about 40 to 50 teeth per meter.

FIG. 10 illustrates the detail view of the bottom view shown in FIG. 9A. In this embodiment, the grass treatment system 100 includes a comb 104 having a plurality of substantially arcuate teeth 904. The comb 104 is positioned underneath and in front the brush 102 such that the comb 104 contacts and collects debris that is present on and around the turf surface 106, and directs the debris towards the brush 102.

Figure 11:
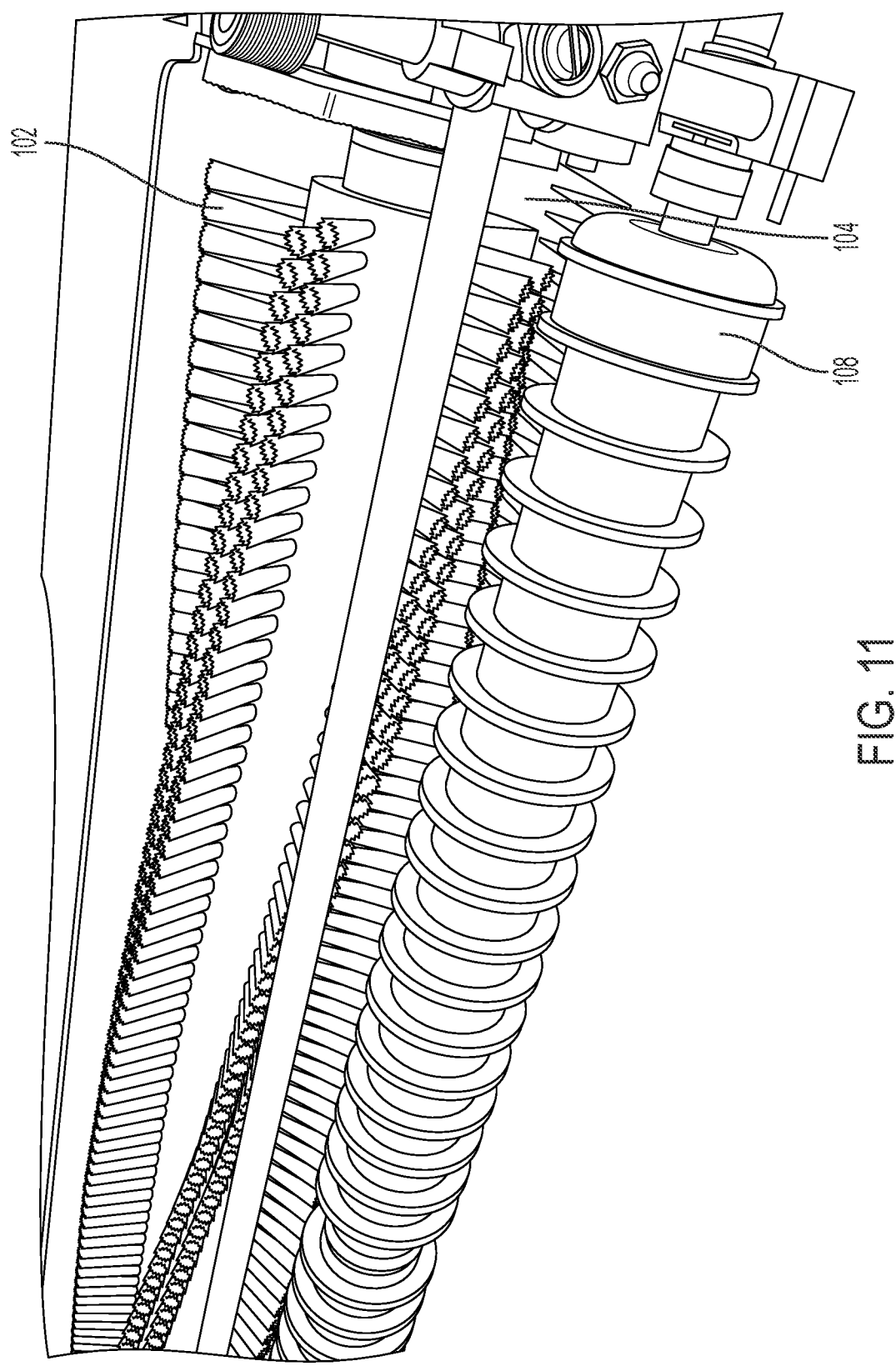
FIG. 11 is an illustration of an example grass treatment system in accordance with aspects of the disclosure.

FIG. 11 is a front perspective view of an example grass treatment system 100 including the brush 102 and comb 104 and front rolling element 108, and their relative placement.

Figure 12:
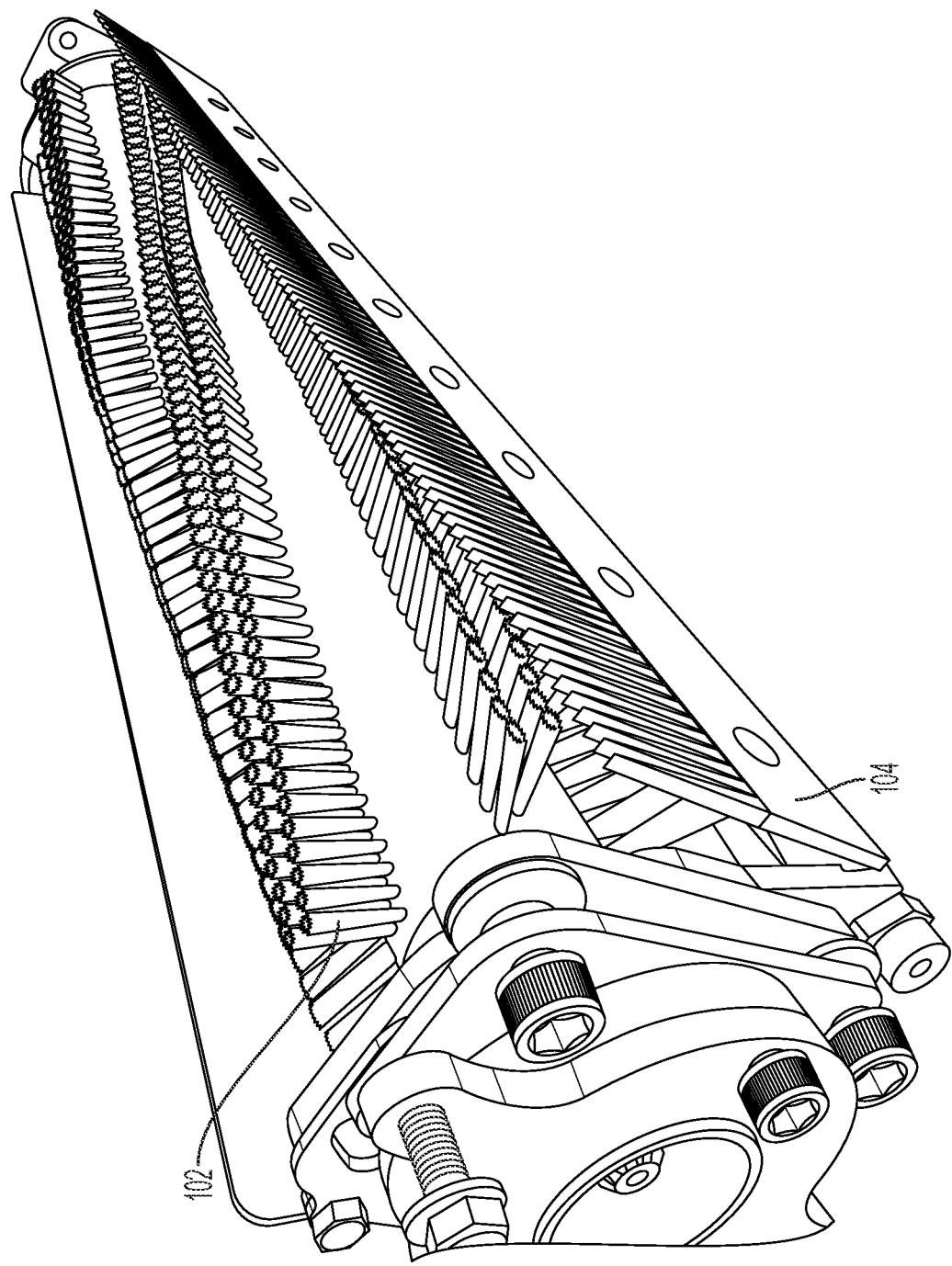
FIG. 12 is an illustration of an example grass treatment system in accordance with aspects of the disclosure.

FIG. 12 is a side perspective view of an example grass treatment system 100 including the brush 102 and comb 104, and their relative placement.

Figure 13:
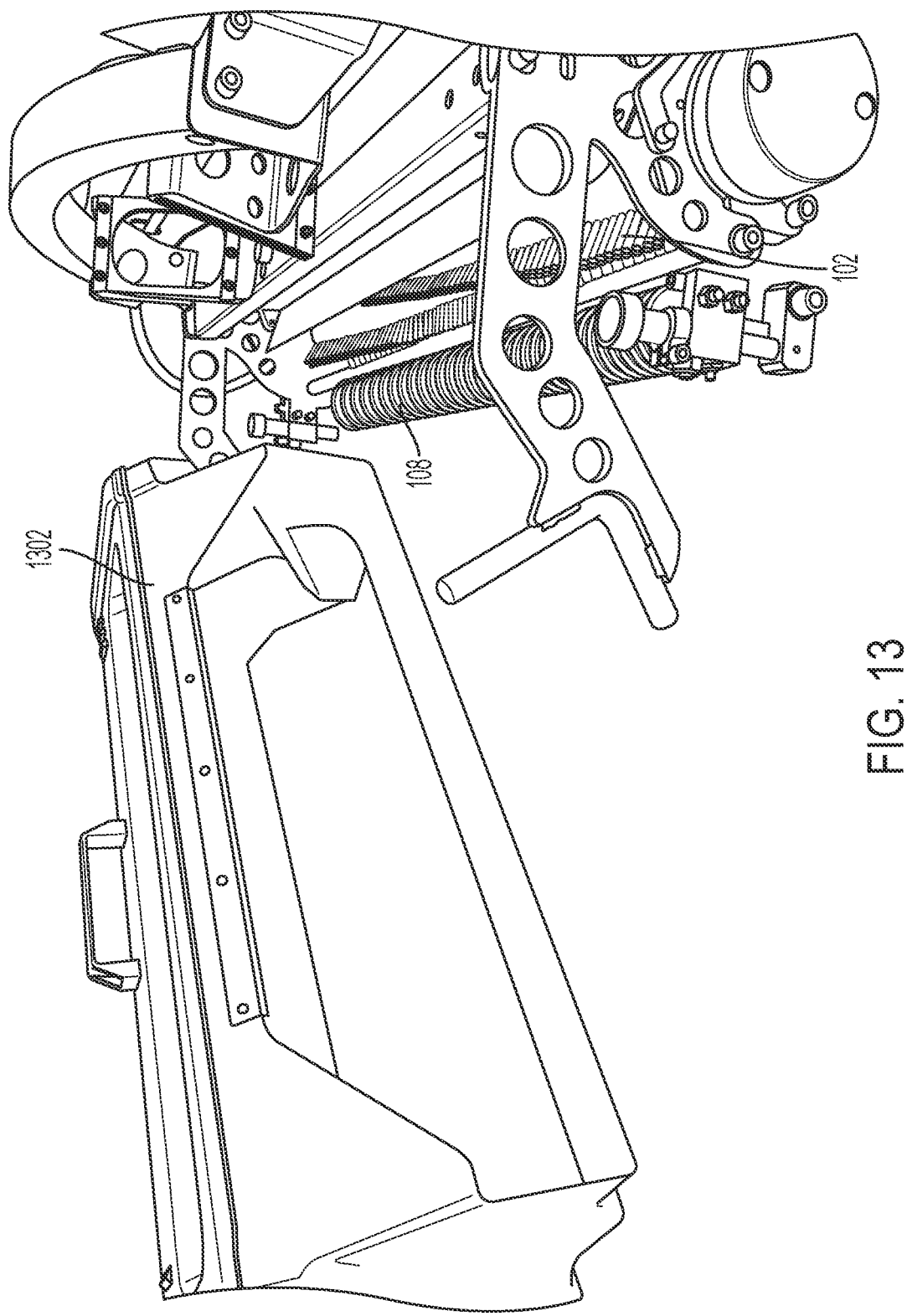
FIG. 13 is an illustration of an example grass treatment system in accordance with aspects of the disclosure.

Referring to FIG. 13, as the grass treatment system 100 is moved across the turf surface 106, the comb 104 catches hold of debris in its path and presents it to the brush 102. The brush 102 contacts the surface of the comb 104 and sweep the debris, e.g. grass clippings, onward to a grass catcher or collection container 1302.

The brush 102 and/or the comb 104 can include repellent technology, for example, a coating, film, or layer that is inherently non-stick and durable. In an embodiment, the coating includes a nanoparticle thin-film coating that exhibits hydrophobic, hydrophilic, and/or self-cleaning properties. The nanoparticle coating can comprise a nanoscale film that interacts with the surface of the brush 102 and/or the comb 104 resulting in a highly repellent surface which repels moisture, water, dirt, and debris. The coating can create a highly repellent, protective layer of nanoscale magnitude on the surface, which prevents or minimizes the tendency of debris to adhere to the brush 102, and/or the comb 104, and provides performance enhancements.

The brush 102 and/or the comb 104 can include a coating possessing hydrophobic properties and which naturally repels water, causing droplets to form. A hydrophobic material repels liquids by causing the liquid to bead-up on the material's surface, and not spread out or wet the material's surface. A hydrophobic surface can prevent or reduce the accumulation of dust, dirt, debris and moisture on the surfaces of the comb 104 and/or the brush 102, and prevents or reduces clumping and clogging of debris that would otherwise interfere with operation of the debris removal.

In other embodiments, the brush 102 and/or the comb 104 can include a coating film, or layer possessing hydrophilic properties. Hydrophilic materials have an affinity for water causing it to spread across a surface, and maximizing contact with the surface, and to reduce the impact on the grass treatment system.

Beads of water encouraged by either of the hydrophobic or hydrophilic coatings can pick up deposited dirt, dust, debris, and the like, that would otherwise accumulate on the surfaces of the comb 104, brush 102, and other surfaces of the grass treatment system, impeding the function and performance thereof. The water beads or droplets are shed carrying the dirt and debris away.

In other embodiments, the grass treatment system comprises a reel mower cutting unit having a rotatable cutting reel which sweeps standing grass against a bedknife to cut the grass, and a comb 104 positioned near the bedknife such that that the comb 104 contacts the turf grass before the grass blades are cut.

In aspects, the comb 104 is configured for use with a reel type mower in which the comb 104 is mounted below and in advance of the bedknife and cutting reel so as to engage the grass in front of the cutting reel. The comb 104 can be secured to the bedknife and does not form a part of the bedknife. The comb 104 loosens the grass, and straightens up bent over blades, so as to maximize the number of grass blades available to the cutting action of the reel, and to provide a more even and high-quality cut, for example, on putting greens of golf courses and grass tennis courts. As the mower is propelled forward, the comb teeth 704, 904 engage and lift the blades of grass and position the grass blades to be cut at a uniform length.

Figure 14:
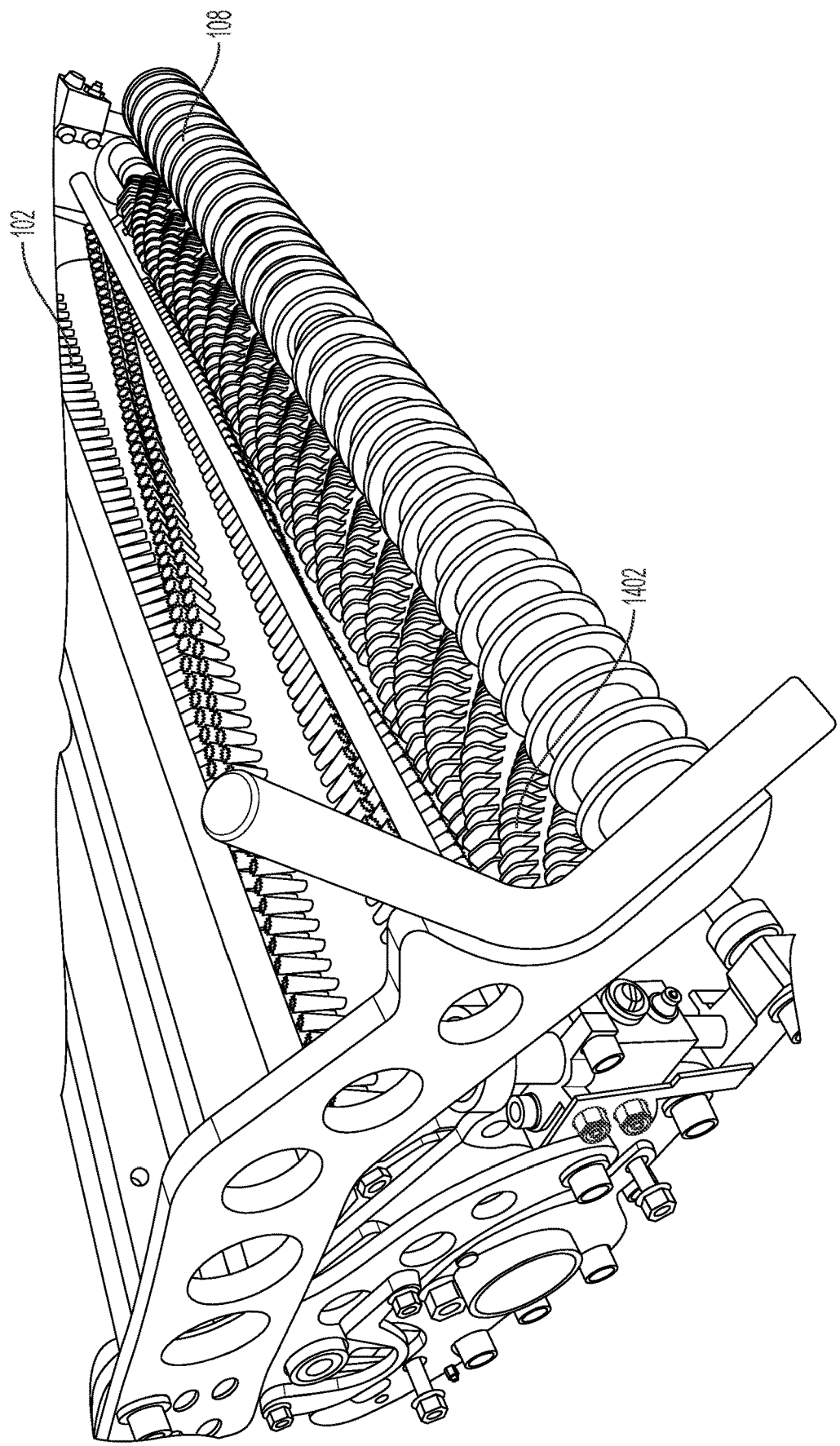
FIG. 14 is an illustration of an example grass treatment system in accordance with aspects of the disclosure.

FIG. 14 is a front perspective view of a portion of an example grass treatment system 100 including the brush 102, a rotatable groomer 1402, and front rolling element 108, and their relative placement. In an embodiment, a brush 102 and comb 104 arrangement as described supra can be supplemented with the addition of a groomer 1402 positioned between the brush 102 and comb 104 (not shown). The groomer 1402 can rotate either in the direction of travel or can contra rotate. The groomer 1402 can be adjusted shallower or deeper independent of the front and rear roller thereby placing it deeper or shallower in the turf canopy. The groomer 1402 is operative to loosen stubborn debris that resides within the turf.

Figure 15:
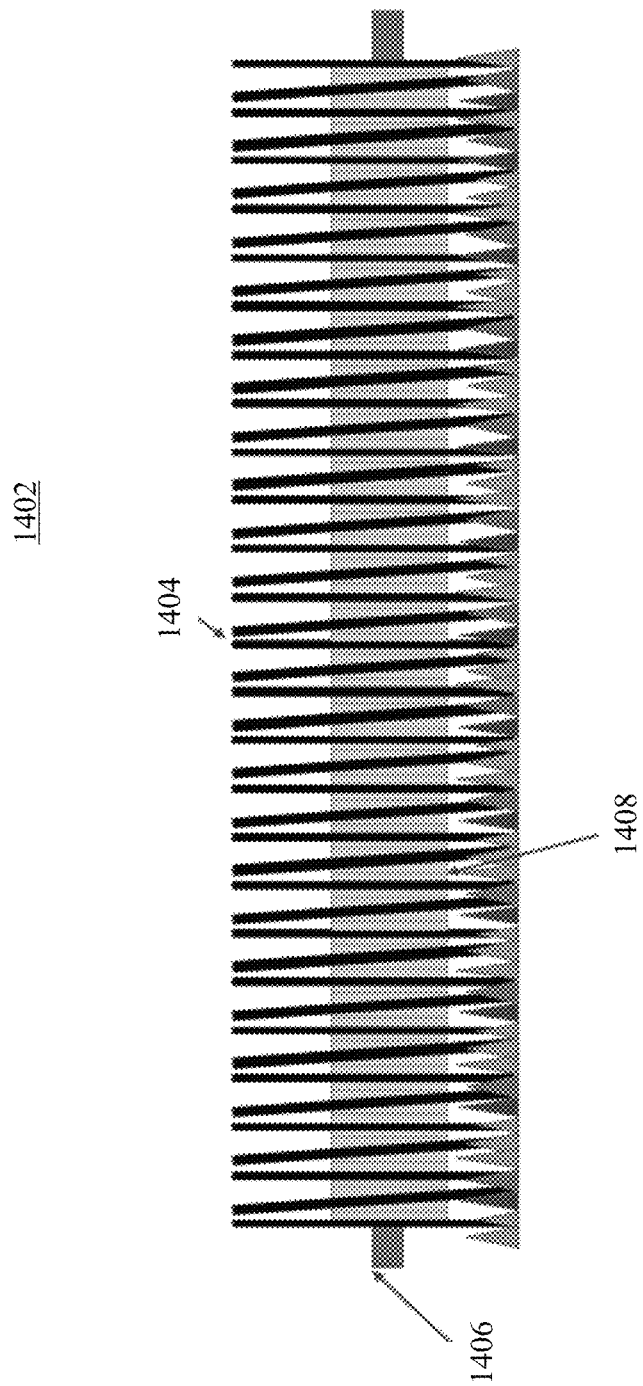
FIG. 15 is an illustration of an example grass treatment system in accordance with aspects of the disclosure.

Referring to FIG. 15, the rotatable groomer 1402 can include alternating angled blades 1404 along its length. The angled blades 1404 are connected to a shaft 1406. The groomer 1402 can include tapered spacers 1408 located between the angled blades 1404, and attached to the shaft 1406. The groomer 1402 works to better lift debris and straighten the grass blades particularly at the portion where the blades "pinch", or are closer together. This arrangement of alternating angled blades increases the chances of contacting any debris that resides in the turf canopy when compared to using parallel blades where debris risks falling through the gaps between the blades.

In further embodiments, the grass treatment system 100 is configured for use on artificial turf sports surfaces, for example, for cleaning and redistribution of the material used for artificial crumb filled surfaces. Artificial turf sports surfaces require routine maintenance to ensure that the rubber crumb infill remains well distributed across the surface, and to prevent compaction which occurs when the infill is pressed down during play and over time.

The grass treatment system 100 can salvage existing infill by cleaning and filtering it, and then returning the infill to the artificial turf surface. In an embodiment, the comb 104 and brush 102 of the grass treatment system 100 can be adjusted via height adjustment 116 and comb adjuster 118 so that artificial turf grass can be restored by removing surface debris, de-compacting infill, lifting the pile of the artificial turf by combing and brushing, and redistributing the infill.

While embodiments have been described, it should be understood that the disclosed technology is not so limited and modifications may be made without departing from the disclosed technology. The scope of the optical sensor housing is defined by the appended claims, and all devices, processes, and methods that come within the meaning of the claims, either literally or by equivalence, are intended to be embraced therein.

The invention claimed is:

1. A grass treatment system, comprising
a first ground engaging rolling element;
a second ground engaging rolling element;
a comb having a leading edge comprising a plurality of comb teeth spaced apart at intervals, wherein the comb is mounted in a horizontal position parallel to a ground surface between the first and second rolling elements and transversely to a direction of travel, and wherein the comb leading edge extends towards the first ground engaging rolling element;
a substantially cylindrical brush positioned above the comb and configured to engage at least a portion of a top surface of the comb, wherein the brush does not contact the ground surface, and
wherein the brush rotates relative to the comb to propel debris lifted from an area of turf grass by the comb.

2. The grass treatment system of claim 1, wherein the comb teeth are positioned to intersect with an upper surface of the turf grass, and are operative to lift debris from a surface of the turf grass to an area within a reach of the brush.

3. The grass treatment system of claim 1, wherein the brush comprises
a substantially cylindrical core extending along a longitudinal axis; and
a plurality of radially extending bristles extending longitudinally along the surface of the core.

4. The grass treatment system of claim 3, wherein the bristles are arranged in one or more columns disposed in one or more helical paths about at least a portion of the longitudinal axis of the core.

5. The grass treatment system of claim 1, wherein the comb comprises a generally planar structure having a continuous spine along a longitudinal direction and transverse to a direction of travel of the system; and
the plurality of comb teeth extend orthogonally to the spine.

6. The grass treatment system of claim 1, wherein the comb comprises an elongated spine, and the plurality of comb teeth extend outwardly from one edge of the spine.

7. The grass treatment system of claim 1, wherein the comb comprises an elongated spine, and a plurality of arcuate teeth extending outwardly from one edge of the spine.

8. The grass treatment system of claim 1, wherein the comb comprises generally equally spaced teeth having an elongated sawtooth profile.

9. The grass treatment system of claim 1, comprising at least one height adjustment mechanism for calibrating an aperture between the top surface of the comb and at least a portion of an outer edge of the brush.

10. The grass treatment system of claim 9, wherein the aperture between the top surface of the comb and the outer edge of the brush is between about 0 mm to 50 mm.

11. The grass treatment system of claim 1, comprising at least one height adjustment mechanism for adjustment of a distance from the comb to a surface of the turf.

12. The grass treatment system of claim 1, the comb is positioned to contact a top portion of the turf grass surface equal to or less than about one third a length of the turf grass.

13. The grass treatment system of claim 1, comprising a rotatable groomer positioned between the comb and brush, wherein the groomer comprises alternating angled blades.

14. The grass treatment system of claim 1, wherein the comb and/or the brush comprise a non-stick nanocoated film or layer, and the nanocoated film or layer comprises at least one of a hydrophobic coating and a hydrophilic coating.

15. The grass treatment system of claim 1, comprising a collection container positioned to receive debris propelled by the brush.

* * * * *